(12) United States Patent
Walker et al.

(10) Patent No.: US 9,042,809 B2
(45) Date of Patent: May 26, 2015

(54) SATELLITE COMMUNICATION HAVING DISTINCT LOW PRIORITY INFORMATION BROADCAST INTO ADJACENT SUB-REGIONS

(71) Applicant: DELPHI TECHNOLOGIES, INC., Troy, MI (US)

(72) Inventors: Glenn A. Walker, Greentown, IN (US); Eric A. Dibiaso, Lebanon, PA (US)

(73) Assignee: Delphi Technologies, Inc., Troy, MI (US)

( * ) Notice: Subject to any disclaimer, the term of this patent is extended or adjusted under 35 U.S.C. 154(b) by 163 days.

(21) Appl. No.: 13/846,983

(22) Filed: Mar. 19, 2013

(65) Prior Publication Data

US 2014/0286453 A1    Sep. 25, 2014

(51) Int. Cl.
*H04H 20/74* (2008.01)
*H04B 7/185* (2006.01)
*H04H 40/90* (2008.01)

(52) U.S. Cl.
CPC ........... *H04H 20/74* (2013.01); *H04B 7/18515* (2013.01); *H04B 7/18523* (2013.01); *H04H 40/90* (2013.01)

(58) Field of Classification Search
CPC . H04L 27/2647; H04L 1/005; H04L 27/2604; H04L 1/208; H04L 27/2078; H04L 27/2601; H04L 27/38; H04B 7/18513; H04B 7/18523; H04H 20/28; H04H 20/30; H04H 20/42; H04H 20/51; H04H 20/67; H04H 20/74; H04H 40/90
USPC ................. 375/260, 308, 329, 261, 279, 330; 455/102, 132, 12.1, 205
See application file for complete search history.

(56) References Cited

U.S. PATENT DOCUMENTS

| | | | |
|---|---|---|---|
| 4,689,625 A | 8/1987 | Barmat | |
| 7,047,029 B1 * | 5/2006 | Godwin et al. | 455/505 |
| 7,835,692 B2 * | 11/2010 | Walker et al. | 455/12.1 |
| 7,883,029 B2 * | 2/2011 | Chalemin et al. | 239/67 |

(Continued)

FOREIGN PATENT DOCUMENTS

| | | |
|---|---|---|
| EP | 0 000 038 A1 | 12/1978 |
| EP | 2 031 771 A2 | 3/2009 |
| WO | 01/13543 A1 | 2/2001 |

OTHER PUBLICATIONS

European Search Report dated Jan. 29, 2015.

*Primary Examiner* — Golam Sorowar
(74) *Attorney, Agent, or Firm* — Lawrence D. Hazelton

(57) ABSTRACT

A satellite communication system using hierarchical modulation to transmit a plurality of modulated signals to sub-regions within a region. Each modulated signal includes high priority content and low priority content. The system includes a satellite equipped with a plurality of satellite transmitters coupled to a plurality of antenna elements, e.g. a phased array of antenna elements. The antenna elements are utilized selectively to direct a modulated signal from a satellite transmitter to a distinct sub-region. The satellite transmitters and antenna also cooperate to broadcast the high-priority content to the region such that a ground receiver traveling from a first sub-region to an adjacent second sub-region adjacent will not experience a loss of high-priority content. First low-priority content of a first modulated signal directed to the first sub-region is independent of second low-priority content of a second modulated signal directed to the second sub-region.

8 Claims, 3 Drawing Sheets

(56) References Cited

U.S. PATENT DOCUMENTS

| | | |
|---|---|---|
| 2003/0179830 A1 | 9/2003 | Eidson et al. |
| 2005/0111580 A1 | 5/2005 | Walker et al. |
| 2006/0133338 A1 | 6/2006 | Reznik et al. |
| 2006/0215790 A1* | 9/2006 | Dibiaso et al. ............... 375/330 |
| 2006/0269005 A1 | 11/2006 | Laroia et al. |
| 2007/0104293 A1* | 5/2007 | Hiatt et al. ................... 375/329 |
| 2008/0137775 A1 | 6/2008 | Kim et al. |
| 2008/0200114 A1 | 8/2008 | Eberlein et al. |
| 2009/0052375 A1 | 2/2009 | Kalhan |
| 2009/0052394 A1 | 2/2009 | Kalhan |
| 2010/0142644 A1 | 6/2010 | Jiang et al. |
| 2010/0261440 A1* | 10/2010 | Corman et al. ................. 455/91 |
| 2011/0222634 A1* | 9/2011 | Walker .......................... 375/340 |
| 2012/0030703 A1* | 2/2012 | Strong ............................ 725/33 |

\* cited by examiner

SATELLITE COMMUNICATION HAVING DISTINCT LOW PRIORITY INFORMATION BROADCAST INTO ADJACENT SUB-REGIONS

TECHNICAL FIELD OF INVENTION

This disclosure generally relates to a satellite communication system, and more particularly relates to using hierarchical modulation to broadcast distinct low priority content in to adjacent sub-regions of a region receiving uniform high priority content.

BACKGROUND OF INVENTION

Satellite broadcast systems that broadcast high priority content directed at a relatively large region and simultaneously use spot beams to broadcast low priority content over sub-regions within the large region are known. The high priority content is sometimes referred to as a national signal that is be broadcast over, for example, the continental United States (CONUS) or across the European continent (PAN European). The low-priority content typically contains information directed to a particular sub-region such as local weather or traffic information, or the low-priority content may be directed to a specific ground receiver within the particular sub-region. In some instances, these low priority or sub-regional transmissions use different frequencies or polarizations to separate the low priority signal from the high priority signal, or separate the combined high and low priority signals directed to one sub-region from those directed to adjacent sub-regions. The regional signal may contain national content, i.e. the same content at different frequencies.

Transmitting low priority content at a carrier frequency different than the carrier frequency used to transmit high priority content undesirably uses more bandwidth than necessary to communicate both the high and low priority content. Also, configuring ground receivers to detect content at different frequencies or polarizations undesirably increases the cost of the ground receiver by increasing the hardware and/or software cost. Transmitting both low and high priority content at the same carrier frequency into one sub-region while transmitting other low priority content with the same high priority content in to an adjacent region can lead to low priority content loss or interference along the boundaries of the adjacent sub-regions.

SUMMARY OF THE INVENTION

In view of the problems set forth above, it would be advantageous to have a system that transmits both national (high priority) and regional (low priority) information or content using the same carrier frequency and polarization, where the high priority content is broadcast in a manner so that a ground receiver traveling from a one sub-region to an adjacent sub-region will not experience a loss of high-priority content.

In accordance with one embodiment, a satellite communication system using hierarchical modulation to transmit a plurality of modulated signals to a region is provided. Each modulated signal includes high priority content and low priority content. The system includes a satellite equipped with a plurality of satellite transmitters coupled to a plurality of antenna elements. The antenna elements are utilized selectively to direct a modulated signal from a transmitter to a distinct sub-region within the region. The plurality of transmitters and the plurality of antenna cooperate to broadcast the high-priority content to the region such that a ground receiver traveling from a first sub-region to a second sub-region adjacent to the first sub-region will not experience a loss of high-priority content. The first low-priority content of a first modulated signal is directed to the first sub-region, and is independent of second low-priority content of a second modulated signal directed to the second sub-region.

Further features and advantages will appear more clearly on a reading of the following detailed description of the preferred embodiment, which is given by way of non-limiting example only and with reference to the accompanying drawings.

BRIEF DESCRIPTION OF DRAWINGS

The present invention will now be described, by way of example with reference to the accompanying drawings, in which.

DETAILED DESCRIPTION

Figure 1:
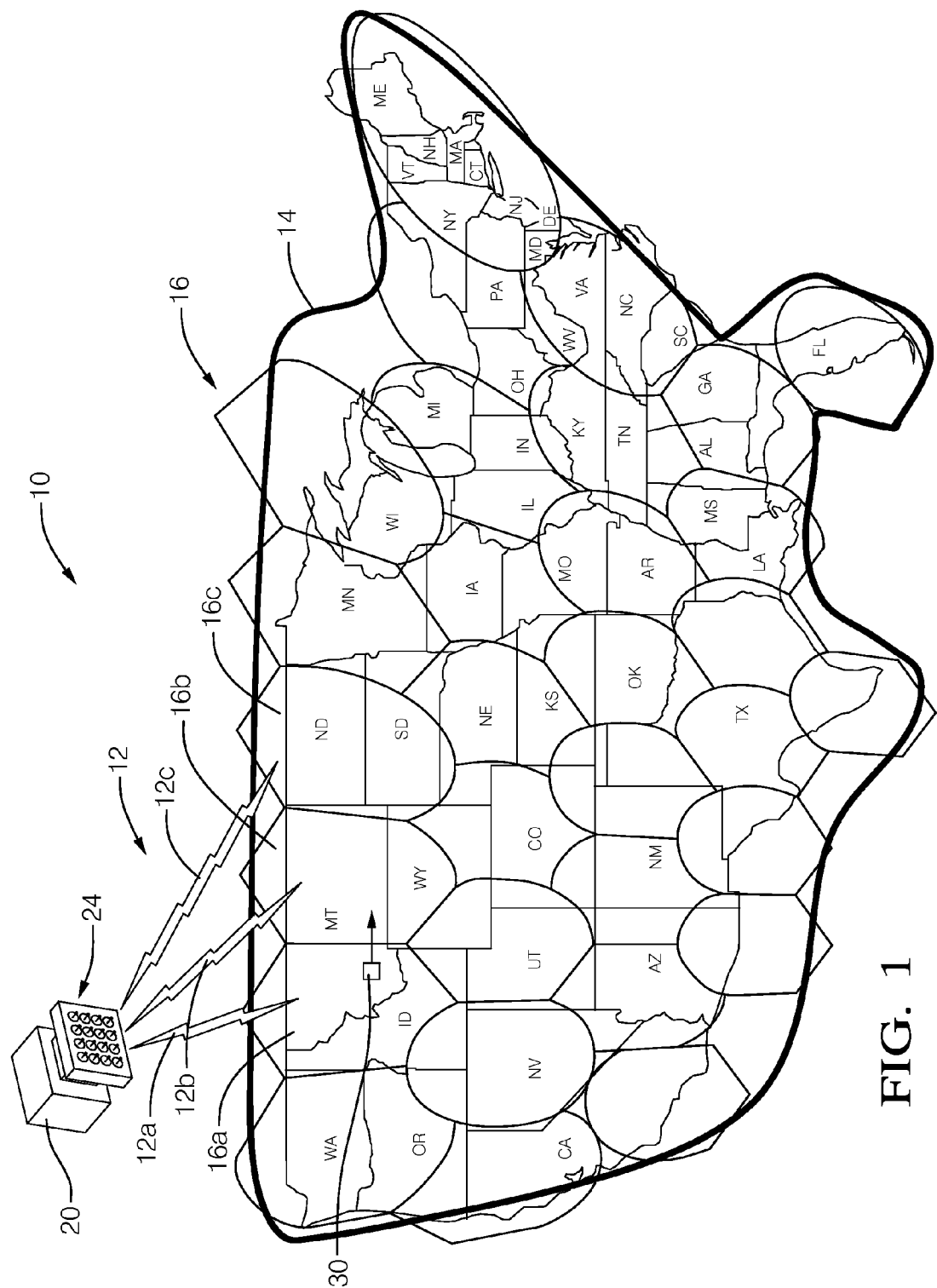
FIG. 1 is diagram of a satellite communication system sending signals to various sub-regions in accordance with one embodiment.

FIG. 1 illustrates a non-limiting example of a satellite communication system, hereafter the system 10. Preferably, the system 10 uses hierarchical modulation to generate signals for a satellite 20 to transmit a plurality of modulated signals 12 to a region 14. In general, hierarchical modulation is known, and is commonly used to simultaneously transmit two separate data-streams, for example a high priority data stream based on high priority content and a low priority data stream based on low priority content. Each of the plurality of modulated signals 12 is directed to at least one of the plurality of sub-regions 16. In this non-limiting example the region 14 is illustrated as the continental United States (CONUS). However, other regions such as Europe, or a larger region such as most of the North America continent are contemplated. In this non-limiting example, the region 14 corresponding to the CONUS is divided into forty-five sub-regions that include sub-regions 16a, 16b, and 16c. By using hierarchical modulation, each of the plurality of modulated signals 12a, 12b, and 12c transmitted by the satellite 20 includes high priority content and low priority content.

By way of example and not limitation, the modulated signals 12a, 12b, and 12c preferably include the same high priority information such as audio and/or video broadcast information, for example, music or a movie. Each of the modulated signals 12a, 12b, and 12c would also include low priority information that may be unique to each of the sub-regions 16a, 16b, and 16c; local weather forecast information for example. Alternatively, the low priority information may be unicast data, i.e. information directed to a specific customer or ground receiver.

By way of further example and not limitation, the modulated signals 12a, 12b, and 12c transmitted by the satellite 20 may have the high priority content modulated using quadrature-phase-shift-keyed (QPSK) signal modulation. The low priority content can then be superimposed or combined with the QPSK signal by way of phase offset modulation of the high priority content, magnitude offset modulation of the high priority content, or a combination of phase and magnitude offset modulation.

Figure 2:
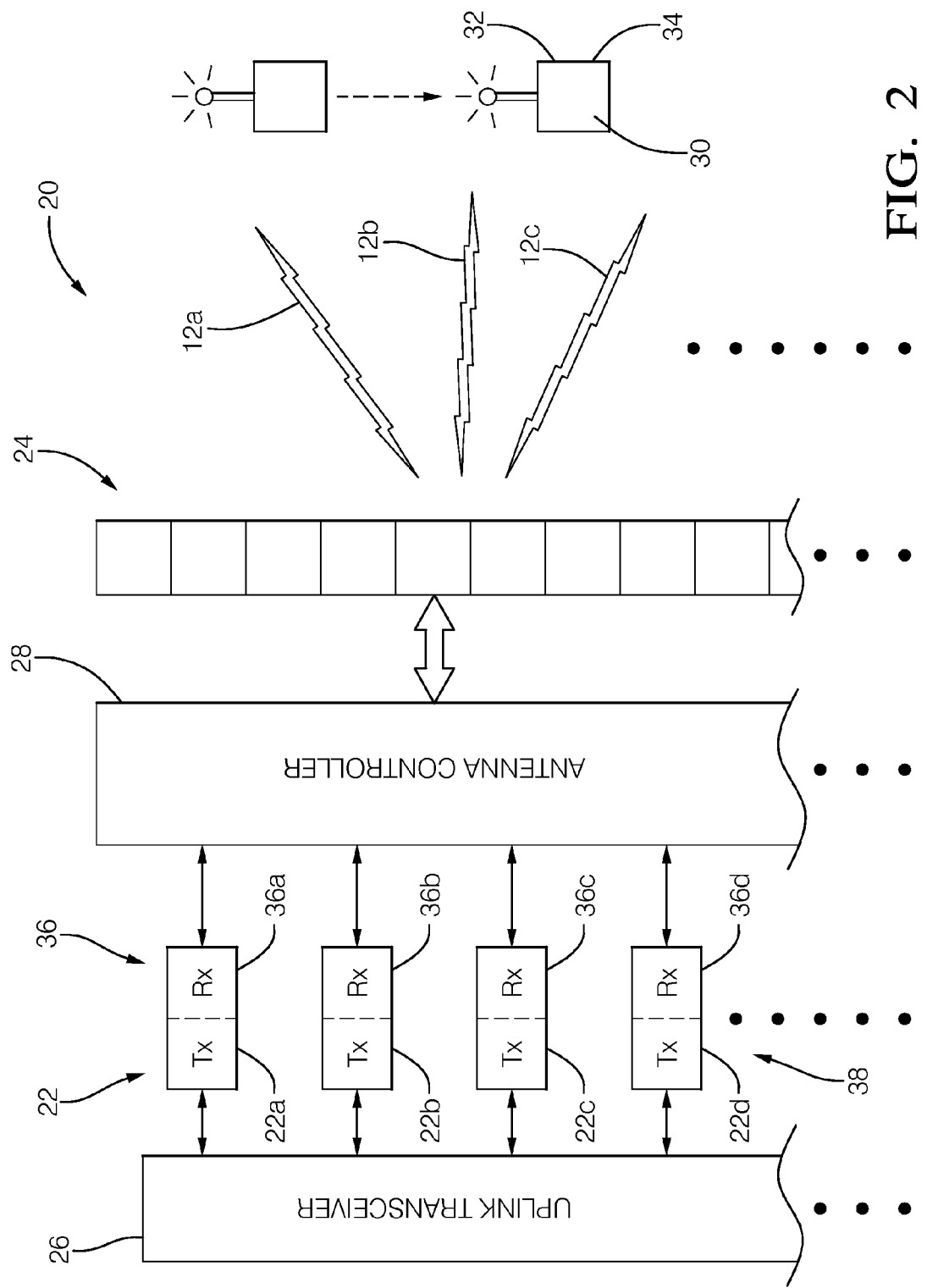
FIG. 2 is a diagram of a satellite in communication with a ground receiver as set forth in FIG. 1 in accordance with one embodiment.

FIG. 2 illustrates in more detail a non-limiting example of the satellite 20. The satellite 20 is typically equipped with a plurality of satellite transmitters 22 coupled to a plurality of antenna elements 24. Signals transmitted by the satellite transmitters 22 may be provided by an uplink transceiver 26 that is in communication with a ground station (not shown), as will be recognized by those in the art. Signals output by the satellite transmitters 22 may be routed through an antenna controller 28 which controls phase delay and/or amplitude of signals sent to each of the plurality of antenna elements 24. The plurality of antenna elements 24 may then be utilized selectively to direct a modulated signal (e.g. 12a, 12b, 12c) from a transmitter (e.g. 22a, 22b, 22c, 22d) to a distinct sub-region (e.g. 16a, 16b, 16c) within the region 14. By way of further example, the plurality of antenna elements 24 may be commonly referred to as a phased-array antenna, which can direct signals in particular directions by altering the phase or delay of signals individually sent to each of the antenna elements 24 to utilize selectively the antenna elements 24.

By way of example and not limitation, signals output by each of the antenna elements 24 may be such that the high priority content is broadcast uniformly over the region 14. As such, the plurality of satellite transmitters 22 and the plurality of antenna elements 24 cooperate to broadcast the high-priority content to the region 14 such that a ground receiver 30 traveling from a first sub-region 16a to a second sub-region 16b adjacent to the first sub-region 16a will not experience a loss of high-priority content. The ground receiver 30 may be installed in a vehicle such as an automobile, truck, train, or other moving vehicle.

Various low priority content or distinct data streams may be mixed with the high priority content as described above so that each sub-region preferentially receives the low priority content for that particular sub-region. For example, first low-priority content of a first modulated signal 12a directed to the first sub-region 16a is independent of second low-priority content of a second modulated signal 12b directed to the second sub-region 16b. By transmitting the high priority content (broadcast content) across a large area (i.e. the region 14) using the base QPSK waveform, the ground receiver 30 will be able to cross spot beam boundaries (i.e. pass from one sub-region into another) without losing the high priority content as the QPSK signal is frequency and phase aligned across the region 14. The low priority data (e.g. unicast content) can be sent as an offset amplitude/phase inside the spot beam area (i.e. within a particular sub-region).

In one embodiment, the high priority content and low priority content may use different forward error correction algorithms. For example, the forward error correction algorithm for the high priority content may be a rate 1/3 Turbo code, while the forward error correction algorithm for the low priority content may be a rate 1/2 Turbo code. The advantage of using two different forward correction algorithms is to allow a service provider the ability to optimize either data throughput or service availability independently for both the high priority and low priority data.

In another embodiment, the system 10 may include a ground transmitter 32 operating in cooperation with the ground receiver 30 to form a ground transceiver 34. Furthermore, the satellite 20 may include a plurality of satellite receivers 36, where each satellite receiver (e.g. 22a, 22b, 22c, 22d) operates in cooperation with one of the plurality of satellite transmitters (e.g. 36a, 36b, 36c, 36d) to form a plurality of satellite transceivers 38. Accordingly, the antenna controller 28 may be further configured so that the plurality of antenna elements 24 are further utilized selectively to preferentially receive a signal (e.g. 12a, 12b, 12c) from each of the plurality of sub-regions (e.g. 16a, 16b, 16c) such that a plurality of ground transceivers (e.g. 34) each located in distinct sub-regions e.g. 16a) can use the same carrier frequency to send messages to the satellite 20.

The system 10 described above addresses the problems of lost high priority content when a ground receiver travels across a sub-region boundary from one sub-region to another sub-region. However, since the low priority content for each sub-region 16a, 16b, 16c may be different, low priority content may not be available at a sub-region boundary due to interference of signals directed to adjacent sub-regions, if further measures are not taken.

Figure 3:
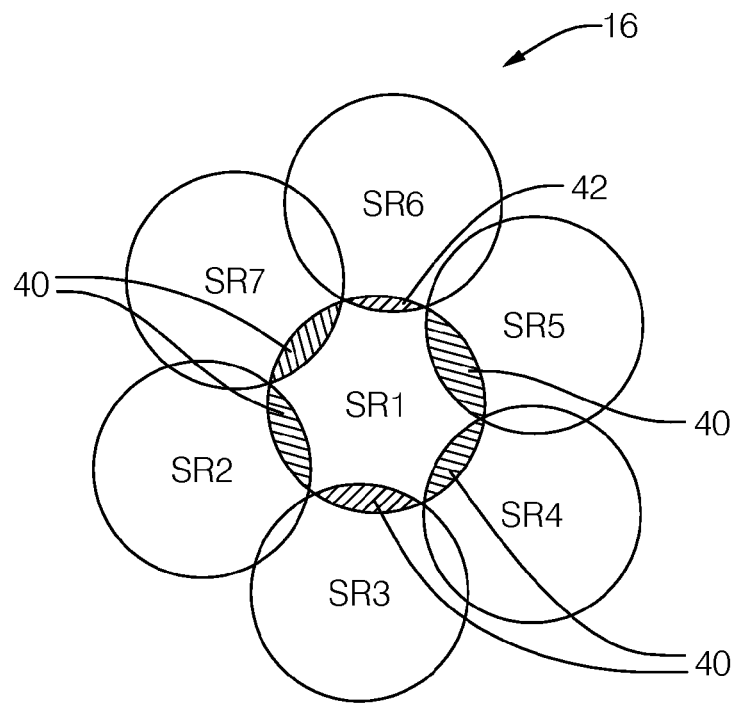
FIG. 3 is a diagram of sub-region signal interference for the system of FIG. 1 in accordance with one embodiment.

FIG. 3 illustrates a non-limiting example of a plurality of sub-regions 16, in particular sub-regions SR1 SR2, SR3, SR4, SR5, SR6, SR7. The shaded area highlights sub-region one (SR1) interference zones 40 where a signal containing low priority content for SR1 overlaps adjacent sub-regions SR2, SR3, SR4, SR5, SR6, SR7. If, for example, a ground receiver is located within interference zone 42 where SR1 and SR6 overlap, a ground receiver attempting to receive either low priority content directed to SR1 or low priority content directed to SR6 may not be able to do so because of signal interference.

Figure 4:
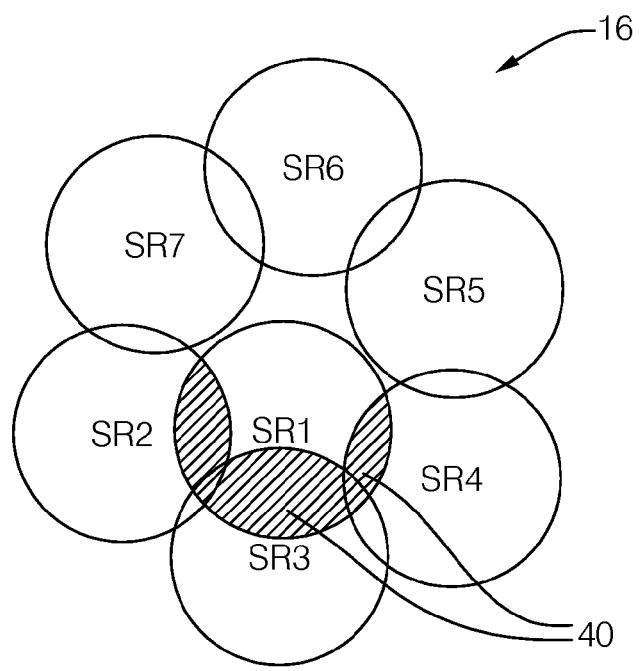
FIG. 4 is a diagram of sub-region signal interference for the system of FIG. 1 in accordance with one embodiment.

FIG. 4 illustrates a non-limiting example of a way to overcome this problem. In general, the plurality of antenna elements 24 are further utilized selectively to move the first sub-region SR1 in a manner effective to reduce low priority content interference with the second sub-region SR6. As shown in FIG. 4, the signal coverage pattern for the first sub-region SR1 is shifted downward (i.e. South) to eliminate interference with the second sub-region SR6, as well eliminating interference with as sub-regions SR5 and SR7. As such, a receiver located in the interference zone 42 shown in FIG. 3 would be able to receive low priority information directed to the second sub-region SR6 without interference.

It is recognized that if a receiver located in the interference zone 42 was supposed to receive low priority content for the first sub-region SR1, that such a shift would make SR1 low priority information unavailable. However the shift shown in FIG. 4 would be temporary, preferably during a predetermined time interval. Then, after the first sub-region SR1 is moved back to the original position shown in FIG. 3, the second sub-region SR6 could be moved north a similar amount, and so a receiver located in the interference zone 42 would be able to receive low priority information directed to the first sub-region SR1, but not low priority information directed to the second sub-region SR6. This pattern of temporarily moving a sub-region by selective utilization of the antenna elements 24 may be continued using a predetermined pattern that provides for the interference shown in FIG. 3 to be eliminated on a periodic basis so that, for example, the low priority content for the first sub-region SR1 can be received over the entire first sub-region SR1 without interference from the surrounding six sub-regions SR2, SR3, SR4, SR5, SR6, SR7.

In another embodiment, the transmission of low priority information into various regions may be momentarily or temporarily interrupted to eliminate interference with low priority information directed to an adjacent sub-region. For example, the system 10 may be configured so first low-priority content for the first sub-region SR1 (or 16a) is transmitted during a first time interval, and second low priority content for the second sub-region SR2 (or 16b) is transmitted at a second time interval distinct from the first time interval. A predetermined pattern is preferably used to determine a sequence for stopping the transmission of low priority information into a particular sub-region so that the interference problem is temporarily mitigated on a periodic basis.

Accordingly, a satellite communication system (the system 10) using hierarchical modulation to transmit a plurality of modulated signals 12 to a region 14 is provided. The plurality of satellite transmitters 22 and the plurality of antenna elements 24 cooperate to broadcast the high-priority content to the region 14 such that a ground receiver 30 traveling from a first sub-region (16a, SR1) to a second sub-region (16b, SR6) adjacent to the first sub-region will not experience a loss of high-priority content. The plurality of antenna elements 24 may be further utilized selectively to move various sub-regions on a temporary basis to temporarily eliminate interference between low priority content directed to adjacent sub-regions. Alternatively, broadcasting of low-priority content to a sub-region may be momentarily interrupted to momentarily eliminate interference near boundaries of the various sub-regions.

While this invention has been described in terms of the preferred embodiments thereof, it is not intended to be so limited, but rather only to the extent set forth in the claims that follow.

We claim:

1. A satellite communication system using hierarchical modulation to transmit a plurality of modulated signals to a region, each modulated signal comprising high priority content and low priority content, said system comprising:
    a satellite equipped with a plurality of satellite transmitters coupled to a plurality of antenna elements, wherein the plurality of antenna elements are utilized selectively to direct a modulated signal from a satellite transmitter to a distinct sub-region within the region, wherein the plurality of satellite transmitters and the plurality of antenna cooperate to broadcast the high-priority content to the region such that a ground receiver traveling from a first sub-region to a second sub-region adjacent to the first sub-region will not experience a loss of high-priority content, wherein first low-priority content of a first modulated signal directed to the first sub-region is independent of second low-priority content of a second modulated signal directed to the second sub-region;
    a ground transmitter operating in cooperation with the ground receiver to form a ground transceiver; and
    a plurality of satellite receivers, each satellite receiver operating in cooperation with one of the plurality of satellite transmitters to form a plurality of satellite transceivers, wherein the plurality of antenna are further utilized selectively to preferentially receive a signal from each of the plurality of sub-regions such that a plurality of ground transceivers each located in distinct sub-regions can use the same carrier frequency to send messages to the satellite.

2. The system in accordance with claim 1, wherein the high priority content is modulated as a quadrature-phase-shift-keyed (QPSK) signal.

3. The system in accordance with claim 1, wherein the low priority content is a phase offset modulation of the high priority content.

4. The system in accordance with claim 1, wherein the low priority content is a magnitude offset modulation of the high priority content.

5. The system in accordance with claim 1, wherein the high priority content and low priority content use different forward error correction algorithms.

6. The system in accordance with claim 1, wherein the high priority content is broadcast data and the low priority content is unicast data.

7. The system in accordance with claim 1, wherein the plurality of antenna elements are further utilized selectively to move the first sub-region effective to reduce low priority content interference with the second sub-region.

8. The system in accordance with claim 1, wherein the first low-priority content is transmitted during a first time interval, and the second low priority content is transmitted at a second time interval distinct from the first time interval.

* * * * *